United States Patent [19]
Cullen

[11] Patent Number: 5,703,976
[45] Date of Patent: Dec. 30, 1997

[54] WAVELENGTH RESONANT FUSED FIBRE COUPLER

[75] Inventor: Thomas John Cullen, Bishop's Stortford, United Kingdom

[73] Assignee: Northern Telecom Limited, Montreal, Canada

[21] Appl. No.: 557,857

[22] Filed: Nov. 14, 1995

[30] Foreign Application Priority Data

Nov. 15, 1994 [GB] United Kingdom ............ 9422986

[51] Int. Cl.[6] ................... G02B 6/26; G02B 6/42
[52] U.S. Cl. ................................. 385/28
[58] Field of Search .................. 385/24, 27, 28, 385/31, 39, 42, 43, 30, 51

[56] References Cited

U.S. PATENT DOCUMENTS

| | | | |
|---|---|---|---|
| 4,557,553 | 12/1985 | McLandrich | 350/96.15 |
| 4,798,436 | 1/1989 | Mortimore | 385/51 |
| 4,867,518 | 9/1989 | Stamnitz | 385/24 |
| 4,883,335 | 11/1989 | Alferness et al. | 385/48 |
| 5,179,603 | 1/1993 | Hall et al. | 385/24 |
| 5,195,151 | 3/1993 | Campbell, Jr. et al. | 385/43 |
| 5,295,211 | 3/1994 | Weidman | 385/43 |

FOREIGN PATENT DOCUMENTS

| | | |
|---|---|---|
| 43 02 133 | 7/1994 | Germany . |
| 2 199 423 | 7/1988 | United Kingdom . |

OTHER PUBLICATIONS

Hill, "WDM all-fiber compound devices: bimodal fiber narrowband tap and equal-arm dissimilar-fiber unbalanced Mach-Zehnder interferometer", Optical Fiber Communication Conference 1990, Jan. 22-26, 1990, p. 99.

*Primary Examiner*—Akm E. Ullah
*Attorney, Agent, or Firm*—Lee, Mann, Smith, McWilliams, Sweeney & Ohlson

[57] ABSTRACT

A wavelength selective 2×2 single mode fibre coupler has a weakly coupled coupling region n which the cladding modes of the two fibres are coupled while the core modes remain uncoupled. A matched pair of core/cladding mode converters are located, one on one fibre on one side of the coupling region, and the other on the other fibre on the other side.

11 Claims, 4 Drawing Sheets

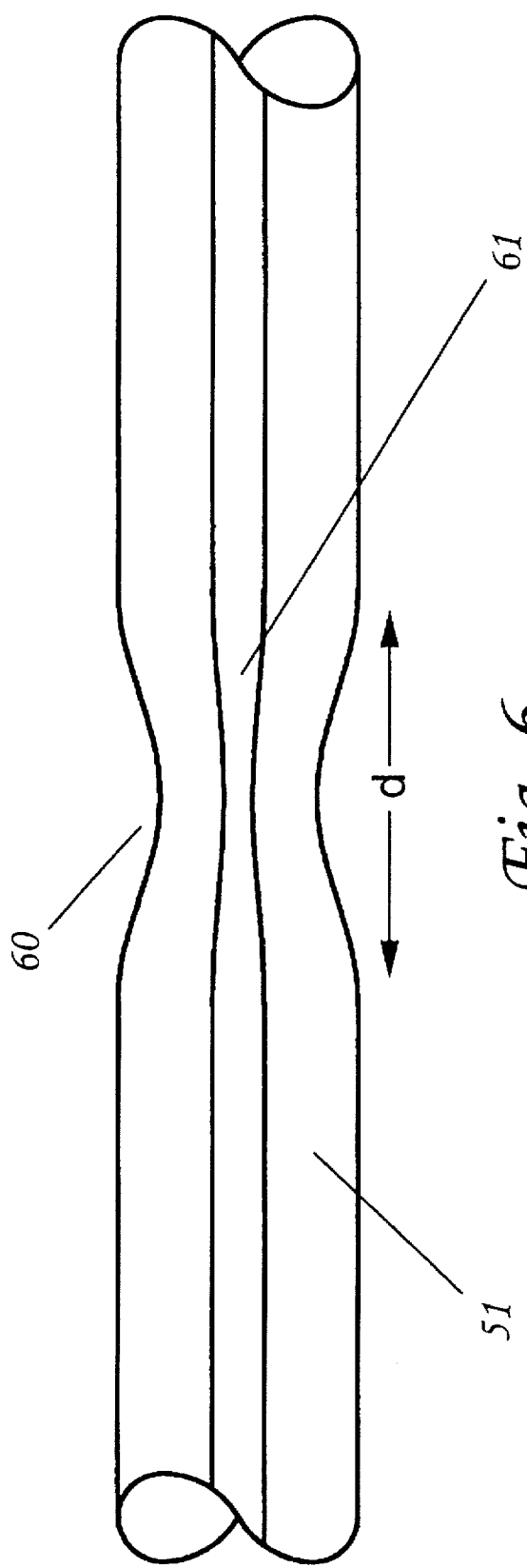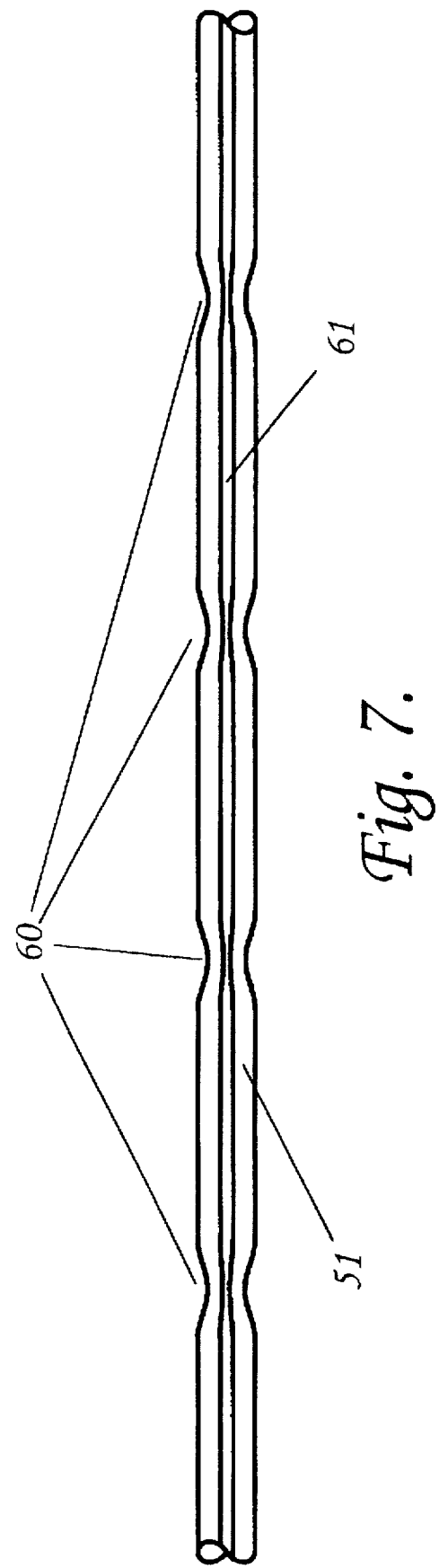

WAVELENGTH RESONANT FUSED FIBRE COUPLER

BACKGROUND OF THE INVENTION

This invention relates to wavelength selective fibre couplers. A known form of fused fibre coupler and its method of manufacture is described in GB 2 150 703 to which attention is directed. In that known type of coupler there is a coupling region in which the fibre cores are so small in diameter, and their physical separation so small, that there is mutual coupling between their core modes. The strength of the coupling is functionally dependent upon the wavelength of the light being coupled. The behaviour of such a coupler constructed from a pair of matched single mode optical fibres can be conceptualised in terms of the optical power launched into one of the fibres being progressively transferred to the other fibre in the course of its passage along the coupling region. If the coupling region is longer than the distance taken for full transfer of the power then, beyond that point, the power is progressively transferred back again to the first fibre. Then, if the coupling region is longer than the distance taken for the full transfer of the optical power back to the original fibre, beyond that point, the cycle of transfer of power between the fibres is repeated. Trace 10 of FIG. 1 depicts this power transfer for a first wavelength, $\lambda_1$, into the second fibre as a function of distance along a coupling region, while trace 11 depicts the power transfer in respect of light of a different wavelength, $\lambda_2$, for which the coupling strength is slightly greater. It is seen that, at a specific distance d, light of wavelength $\lambda_1$ has been fully transferred to the second fibre for the fourth time whereas, at the same specific distance d along the coupling region, light of wavelength $\lambda_2$ has been fully transferred back to the first fibre for the fourth time. Accordingly, if the coupling region ends at distance d, it will function as a wavelength multiplexing coupler for multiplexing wavelengths $\lambda_1$ and $\lambda_2$. For this coupler with the specific coupling distance d, it has been established that light of wavelength $\lambda_2$ launched into one end of the first fibre will emerge from the coupler exclusively by way of the same fibre, while light of wavelength $\lambda_1$, similarly launched into that end of that first fibre, will emerge from the coupler exclusively by way of the other fibre. Light of an intermediate wavelength, also similarly launched into that end of that first fibre, will emerge from the coupler partly by way of the first fibre, and partly by way of the second. The division of the power between the two output fibres is determined by the closeness of that intermediate wavelength to either one of the two wavelengths $\lambda_1$ and $\lambda_2$. This characteristic is depicted in FIG. 2. Here trace 20 is a plot, as a function of wavenumber $\kappa$, where $\kappa=1/\lambda$, of the proportion of the power launched into the coupler by way of the first fibre that emerges from that coupler by way of the second fibre. Similarly trace 21 is a plot of the power that emerges by way of the first fibre. At wavenumber $\kappa_1=1/\lambda_1$, traces 20 and 21 are respectively at 100% and zero, while at $\kappa_2=1/\lambda_2$, the traces are respectively at zero and 100%. Inspection of FIG. 2 reveals that light of wavelength $\lambda_3=1/\kappa_3$ launched into the first fibre emerges from the coupler exclusively by way of the second fibre, that light of wavelength $\lambda_4=1/\kappa_4$ launched into the first fibre emerges exclusively from the coupler by way of the first fibre, and that light of wavelength $\lambda_5=1/\kappa_5$ emerges partly by way of the first fibre, and partly by way of the second. Therefore the coupler is clearly capable of multiplexing already multiplexed signals at wavelengths $\lambda_1$ and $\lambda_3$ with already multiplexed signals as $\lambda_2$ and $\lambda_4$. This is achievable by launching the former on to one fibre, and launching the latter on to the other. On the other hand this coupler is incapable of multiplexing a signal at wavelength $\lambda_5$ with a signal at wavelength $\lambda_1$, $\lambda_2$, $\lambda_3$ or $\lambda_4$. Thus it is seen that this type of wavelength sensitive fused fibre coupler can in principle readily be designed for wavelength multiplexing a pair of signal of any chosen two wavelengths but, for multiplexing a third and subsequent signals of different wavelengths, there are constraints imposed upon the relationships that must pertain between the wavelength separation between the first two wavelengths and that between either of these wavelengths and that of any such additional wavelengths.

SUMMARY OF THE INVENTION

The present invention is directed to an alternative form of wavelength sensitive fused fibre coupler which does not exhibit this kind of wavelength separation constraint.

According to the present invention there is provided a wavelength selective fibre coupler having first and second single mode optical fibres provided with a coupling region in which the cladding modes of the fibres are optically coupled while their core modes remain substantially uncoupled, which coupler additionally includes a substantially matched pair of core/cladding mode converters provided respectively on the first and second optical fibres respectively upstream and downstream of the coupling region.

The coupling region in which only cladding modes of the two fibres are coupled provides a coupling that is substantially wavelength independent. Wavelength selectivity for the structure is instead provided by the core/cladding mode converters. A form of multimode optic fibre core/cladding mode converter is for instance described in the paper of L. Jeunhomme et al entitled 'Directional coupler for multimode optical fibers', Applied Physics letters Vol 30 No 8 (15 Oct. 1976) pages 485–7. Mode conversion is in this instance achieved by inducing a periodic bend structure in the fibre by laterally compressing it between the complementary ribbed surfaces of two plates. The application of an equivalent technique to induce core/cladding mode conversion in single mode fibre is for instance described in GB 2 155 621. Mode conversion is induced by a 'resonance' effect that occurs when the core mode and cladding mode propagation constants, $\beta_\lambda$ and $\beta'_\lambda$, for a particular wavelength are related to the period, $\Lambda$, of the bend structure induced in the fibre by the equation:

$$\beta\lambda-\beta'_\lambda=2\pi/\Lambda$$

BRIEF DESCRIPTION OF THE DRAWINGS

There follows a description of wavelength selective fused fibre couplers embodying the invention in preferred forms. Reference has already been made to FIGS. 1 and 2 of the accompanying drawings, and in the been made to FIGS. 1 and 2 of the accompanying drawings, and in the ensuing description reference will additionally be made to FIGS. 3 and 4, in which.

DETAILED DESCRIPTION OF THE PREFERRED EMBODIMENTS

Figure 1:
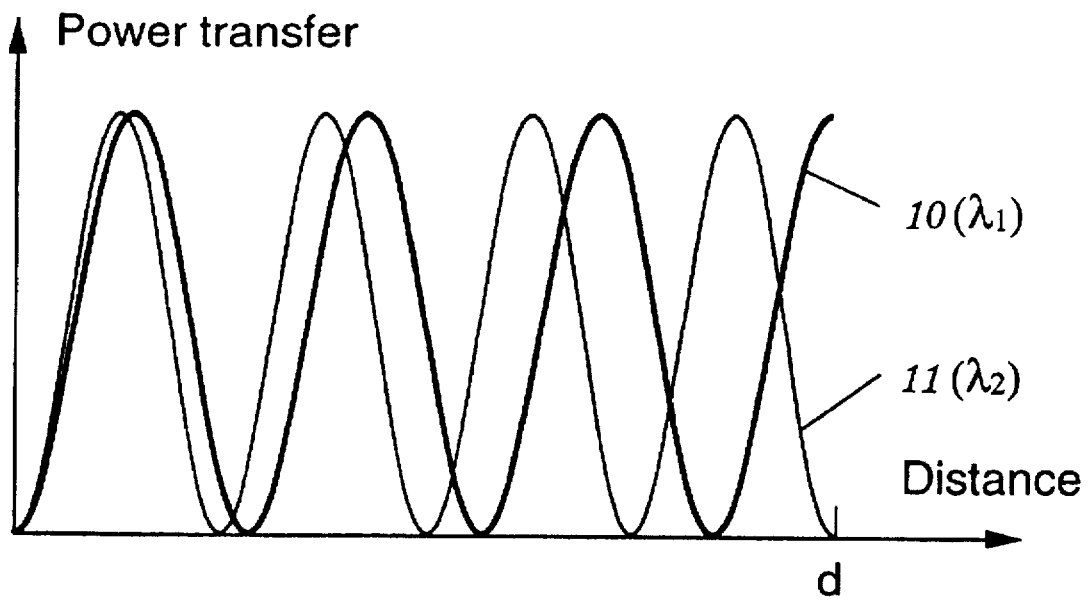
FIG. 1 is a graphical representation illustrating how coupling varies as a function of distance along the coupling region of a prior art coupler.
Figure 2:
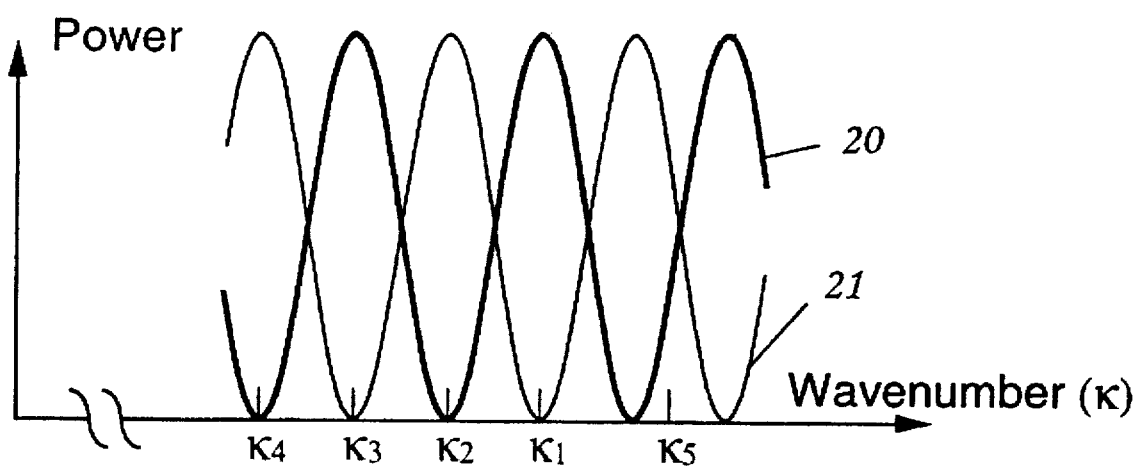
FIG. 2 is a graphical representation illustrating how, in the same prior art coupler, the coupling varies as a function of wavelength.
Figure 3:
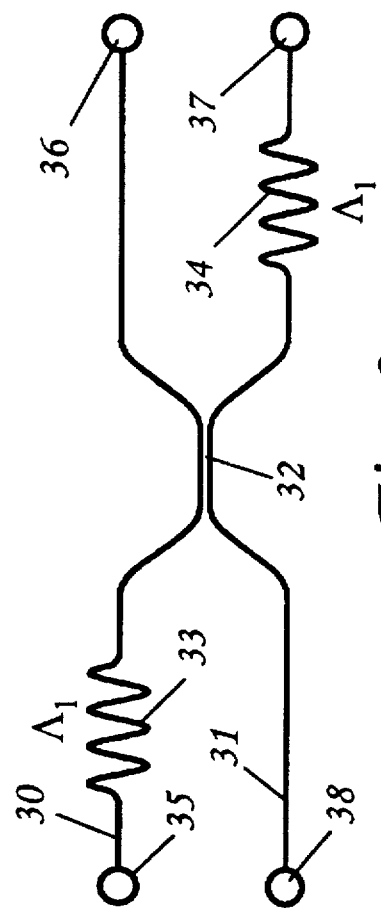
FIG. 3 is a schematic representation of a coupler embodying the invention in a preferred form.

Referring to FIG. 3, two single mode fibres 30 and 31 are arranged side by side over a portion of their length, the portion which is to become the coupling region 32. In this coupling region the two fibres are fused together and progressively stretched using a coupler manufacturing method substantially as described in GB 2 150 703 (to which reference has previously been made). In this instance the progressive stretching is halted long before such stretching induces the onset of any coupling between the core modes of the two fibres. More particularly it is halted at the point at which the cladding mode power transfer from the first to the second reaches its first maximum.

A matching pair of core cladding mode converters 33, 34 of period $\Lambda_1$ are provided on opposite sides of the coupling region 32 respectively on substantially the manner as described in GB 2 155 621A, to which previous reference has been made. An alternative method of providing them is by a technique substantially as described in GB 2 214 650. The periodicity $\Lambda_1$ of the two mode converters is chosen so as to effect mode conversion for light at a wavelength $\lambda_1$. Generally, but not necessarily these mode converters are designed to provide as near as possible 100% mode conversion efficiency.

By using port 35 as an input port and port 37 as an output port, the coupler of FIG. 3 may be used as a narrow pass-band filter selectively transmissive to light at wavelength $\lambda_1$; if instead port 36 is used as the output, the coupler functions as a narrow rejection-band filter. On the other hand the coupler may be used for multiplexing a signal at wavelength $\lambda_1$ with a signal at some other wavelength by using port 35 as the output port, and by applying the $\lambda_1$ wavelength signal to port 37 while the other signal is applied to port 36. Additionally, by using port 35 as an input port and ports 36 and 37 as output ports, the coupler may be used as a channel dropping filter that allows extraction of a signal at wavelength $\lambda_1$ by way of port 37. Reversing the direction of propagation of the light through the coupler, it becomes a channel insertion filter. In every instance any light launched into the core of either of the fibres 30 and 31 at a wavelength other than $\lambda_1$ is substantially unaffected in it passage through either of the core/cladding mode converters 33 and 34 because at such wavelengths the resonant condition satisfying the equation $$\beta_\lambda - \beta'_\lambda = 2\pi/\Lambda$$

is not met. Accordingly such light is still propagating in the core mode when it reaches the coupling region 32, and here also it is substantially unaffected in its passage through this coupling region because this coupling region has been specifically constructed to effect coupling between the cladding modes of the two fibres 30 and 31, but not between their core modes. In particular it may be noticed that when the coupler is employed as a channel insertion filter or multiplexer, if the signal applied to the coupler by way of port 37 includes components at wavelengths other than that satisfying the question $$\beta_\lambda - \beta'_\lambda = 2\pi/\Lambda$$

for mode converter 34, then those other wavelength components, which may even include one or more components at wavelengths matching those contained in the signal applied to the coupler by way of terminal 36, will not be multiplexed on to fibre 30. On the other hand should the signal applied to the coupler by way of terminal 36 have a wavelength components that satisfies the equation $$\beta_\lambda - \beta'_\lambda = 2\pi/\Lambda$$

then, even though this component will not be multiplexed across to fibre 31 (because it is still propagating through the coupler in the core mode), it will be converted to cladding mode power by mode converter 33, and therefore its power will become dissipated.

It was previously stated that the core-cladding mode converters are generally designed to provide as near as possible 100% mode conversion efficiency, but in some circumstances it is desirable to use a mode converter specifically designed to provide less than 100% mode conversion efficiency. Thus for example, if the coupler is being used in an optical amplifier to multiplex signal power at a wavelength $\lambda_1$ with pump power at a wavelength $\lambda_2$, then the coupler may be employed to multiplex the pump power with the bulk of the signal power while leaving a residual proportion of the signal power unmultiplexed for monitoring purposes use. In these circumstances mode converter 34 could be retained as a maximum conversion efficiency converter, while mode converter 33 is not. If the signal power and pump power are respectively applied to ports 35 and 38, most of the signal power is multiplexed by the coupler with the pump power to appear as an output at port 37, while a residual portion of the signal power appears for monitoring purposes at port 36.

Figure 4:
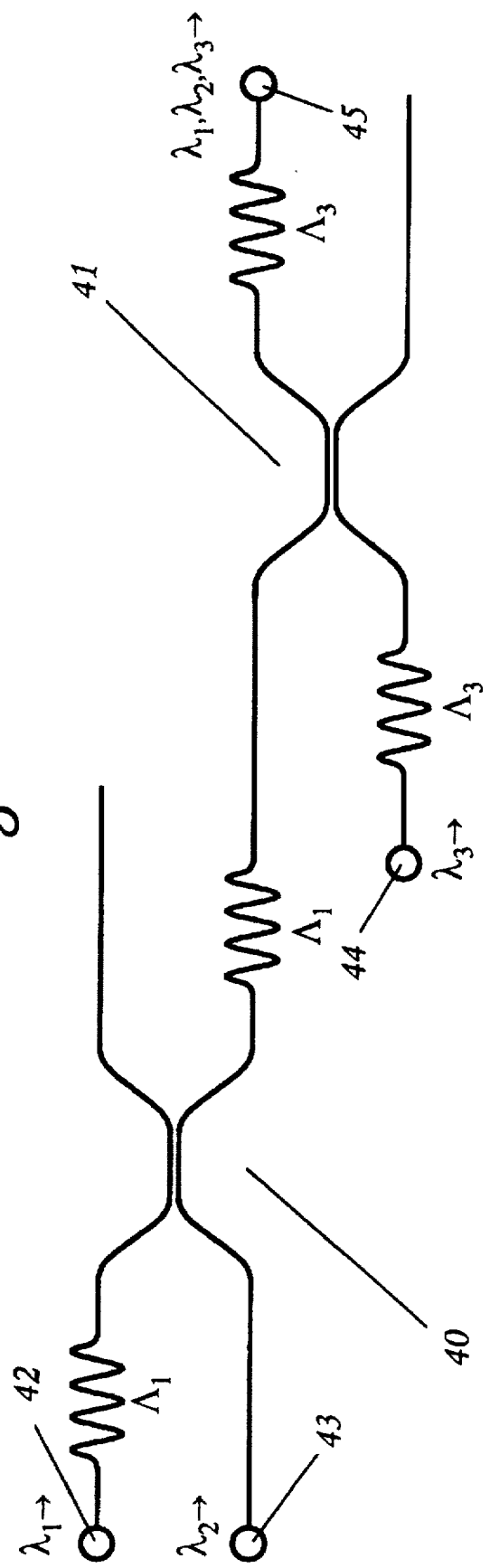
FIG. 4 is a schematic representation of two couplers embodying the present invention in a preferred form connected optically in cascade.

As discussed previously, one of the features of these couplers according to the present invention is that they can be connected optically in cascade (concatenated) for channel insertion or channel dropping purposes without themselves imposing design constraints upon the relative wavelength spacing of the wavelengths being multiplexed or demultiplexed by the cascade. For illustrative purposes, FIG. 4 depicts a cascade of only two couplers 40 and 41, but clearly the principles of operation are extendible to larger cascades. In this particular example the two mode converters of coupler 40 have a periodicity $\Lambda_1$ chosen to effect mode conversion of light at a wavelength $\lambda_1$, while the corresponding mode converters of coupler 41 have a periodicity $\Lambda_3$ chosen to effect mode conversion of light at a wavelength $\lambda_3$. When used for channel insertion, a channel at a wavelength $\lambda_1$ is applied at port 42 for insertion on traffic containing a channel at a wavelength $\lambda_2$ applied at point 43, and similarly a channel at a wavelength $\lambda_3$ is applied at port 44. All three channels ($\lambda_1, \lambda_2$, & $\lambda_3$) appear at output port 45.

In the foregoing description it has been implicitly assumed that each individual mode converter had a single periodicity $\Lambda$, and so is effective at a single wavelength $\lambda$. However it should be understood that both members of a pair of mode converters can alternatively be composed of a set of sections of different periodicity $\Lambda$ effective at a set of discrete wavelengths $\lambda$, or can comprise a single section in which the periodicity $\Lambda$, is chirped so as to be effective over a specific range of wavelengths $\lambda$. Thus, for instance, in a cascade of couplers used for channel insertion or channel dropping purposes, it should be evident that if desired more than one channel may be inserted or dropped at any one location by choosing for that location a coupler whose pair of matched mode converters are of the type composed of a set of sections of different periodicity.

In the foregoing specific description the coupling region 32 of a coupler has taken the form of a tapered fused fibre coupler constructed using a progressive stretching method substantially as described in GB 2 150 703. It is however not necessary for the coupling region to be constructed by a progressive stretching method, nor indeed is it necessary for the coupling region to be of the tapered fused fibre type. The coupling region can for instance alternatively be constructed in a manner analogous with the construction of a 3 dB 'polished half-coupler' 2×2 fibre coupler. In a conventional 3 dB polished half-coupler, each of the two half-couplers is created by polishing a flat on the side of the fibre, and then the two halves are assembled with the flats in contact with each other. By virtue of the polishing, the cores are separated in the region of the flats by a distance significantly less than a fibre diameter, and more particularly this distance is so small that there is mutual coupling between the core modes of the two fibres. For the purpose of creating a cladding mode coupler, the polishing is performed to a much reduced extent that leave the cores of the two fibres separated by a distance large enough to leave their core modes substantially uncoupled, the intimate contact between the two flat being sufficient to provide the requisite amount of coupling between the cladding modes of the two fibres.

Figure 5:
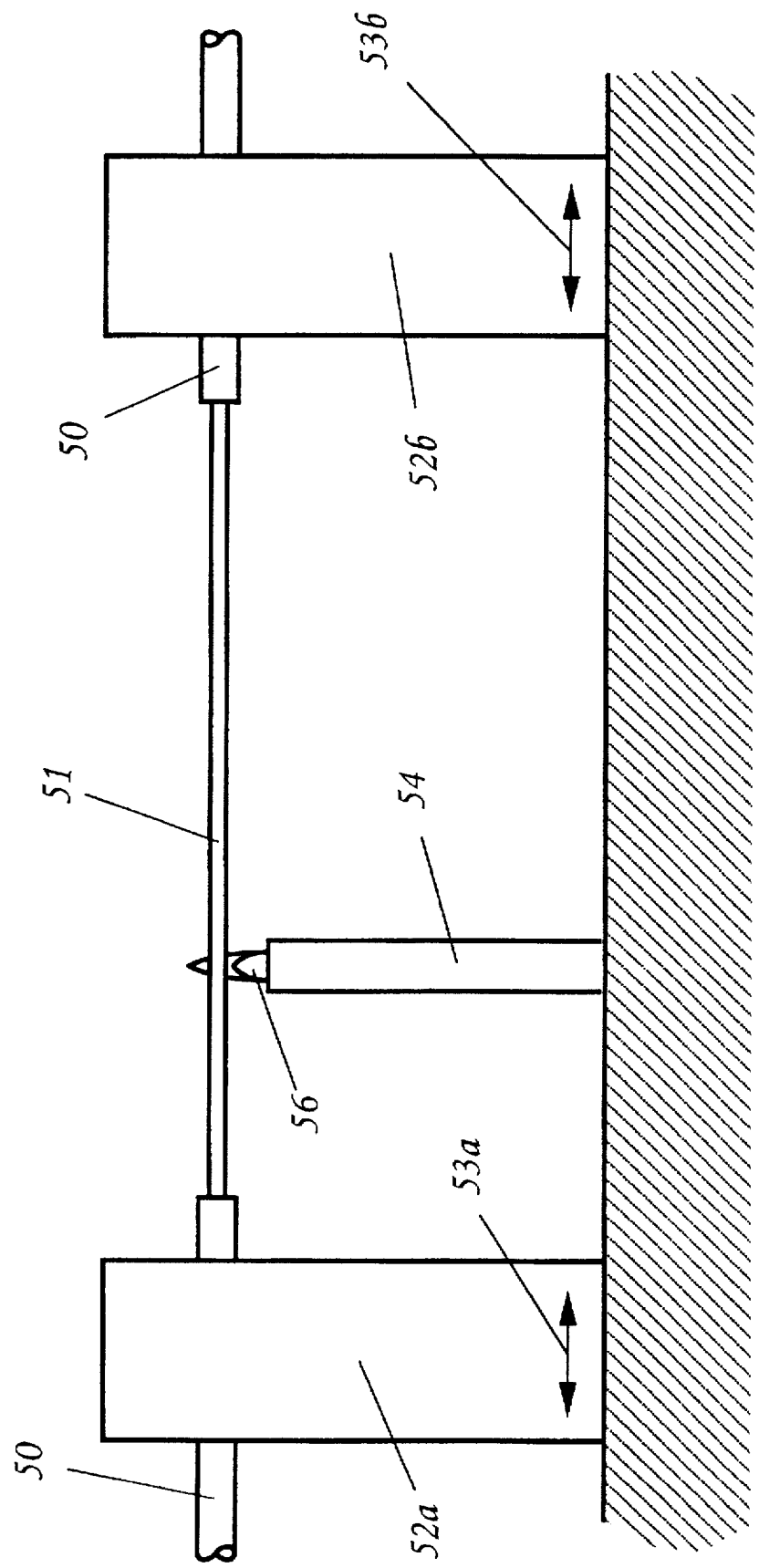
FIG. 5 depicts a schematic representation of apparatus employed in one method of creating the mode converters of the coupler of FIG. 3, and FIGS. 6 and 7 respectively depict a single perturbation and a set of equispaced perturbations created in a length of optical fibre to produce a mode converter of the coupler of FIG. 3 using the apparatus of FIG. 5.

An alternative to the methods referred to previously for making the core/cladding mode converters for couplers constructed in accordance with the teachings of the present invention is described in the specification of British Patent Application No 9506932.4. In essence this method comprises using a microburner to create a series of sharply localised perturbations in a length of single mode fibre from which its plastics protective coating has been removed. Referring to FIG. 5, a central section of the plastic protective coating, typically an acrylate coating, of a plastics protective coated length 50 of single mode fibre is stripped from the fibre and the bare fibre 51 thereby exposed is acid cleaned. The fibre 50 is mounted by its plastics coated ends between two clamps 51a and 51b so that the exposed bare fibre 51 extends in a straight line. The two clamps 52a, 52b are independently motor driven in a controlled manner along a common line indicated by arrows 53a and 53b that is aligned with the direction of axial extent of the bare fibre 51. A sharply localised heat source, for instance provided by a microburner 54 burning a methane/oxygen mixture, is mounted so as to be moveable in a motor-driven controlled manner along direction that extends at right-angles the axis of the bare fibre 51 between the two clamps 52a and 52b, and so as to be moveable into and out of registry with a short potion of that bare fibre. The jet of the microtorch may conveniently be provided by hypodermic tubing providing a flame 56 with a width in the axial direction of the fibre of about 800 µm.

The flame 56 of the microburner 55 is employed to provide a relatively sharply localised heat-softened zone in the bare fibre 51, and the two clamps 53a and 53b are moved apart a controlled distance to cause a biconical neck 60 (FIG. 6) to form in the fibre by plastic flow of its glass. At the same time a similar biconical taper is formed in the core 61 of the fibre 51. The forming of this biconical taper can be performed as a non-overlapping sequence of operations comprising, first moving the flame into position around the fibre, next moving the clamps apart the requisite amount, and then removing the flame. The avoidance of overlapping of these operations is however not essential because the fibre is able to withstand a certain amount of tensile strain before its temperature has been raised sufficiently to cause such strain to be relieved by plastic flow, and because there will be a certain interval of time between the commencement of the removal of the flame and the lowering of the temperature of the fibre to an extent where plastic flow is no longer possible.

With conventional 125 µm external diameter single mode transmission type fibre, it is found that reducing the fibre diameter down from 125 µm to about 95 µm over a total distance 'd' from one end of the biconical taper to the other of about 800 µm, provides a large enough taper angle to produce a non-adiabatic perturbation of the transmission properties of the fibre.

After the formation of the first perturbation, the two clamps are indexed along a predetermined distance before repeating the operation to produce the next perturbation. In this way a whole set of perturbations are created as depicted in FIG. 7.

Usually it will be desired that the perturbations are identical and equispaced. A periodic structure of this sort results in resonant coupling between the core-guided fundamental $HE_{11}$ mode and the cladding-guided $HE_{12}$ mode at a specific wavelength determined by the condition $$\lambda_c = p \times (n_{e1} - n_{e2})$$

where $\lambda_c$ is the centre wavelength p is the pitch of the periodic structure $n_{e1}$ is the effective refractive index of the $HE_{11}$ mode @ $\lambda_c$, and $n_{e2}$ is the effective refractive index of the $HE_{12}$ mode @$\lambda_c$.

I claim:

1. A wavelength selective fibre coupler having first and second single mode optical fibres each capable of supporting a core mode and a cladding mode, which coupler is provided with a coupling region through which the core mode of each fibre propagates in a manner effectively uncoupled with the core mode of the other fibre, and in which coupling region the cladding modes of the fibres are optically coupled, which coupler additionally includes a matched pair of spectrally selective resonant core/cladding mode converters provided respectively on the first and second optical fibres respectively upstream and downstream of the coupling region.

2. A coupler as claimed in claim 1, wherein the members of the matched pair of mode converters are distinguished in that for only one of the mode converters is the coupling efficiency maximised.

3. A coupler as claimed in claim 1, wherein the coupling efficiency of both mode converters is maximised.

4. A coupler as claimed in claim 1, wherein the coupling region is a tapered fused fibre type coupling region.

5. A coupler as claimed in claim 1, wherein the coupling region is a polished half-coupler type coupling region.

6. A coupler as claimed in claim 1, wherein each of the mode converters provides the fibre of that mode converter with a periodic structure composed of two or more sections of different periodicity.

7. A coupler as claimed in claim 1, wherein each of the mode converters provides the fibre of that mode converter with a periodic structure the periodicity of which is chirped.

8. A coupler as claimed in claim 1, wherein each of the mode converters has a periodic structure induced by the urging of the fibre of that mode converter against a ribbed surface.

9. A coupler as claimed in claim 1, wherein each of the mode converters has a periodic structure consisting of a set of axially spaced perturbations in the fibre of the converter, each of which perturbations has been created by axially stretching the fibre to produce plastic deformation in a heat-softened zone thereof sufficiently sharply localised to result in the formation of a non-adiabatic taper.

10. A plurality of couplers as claimed in claim 1, the members of which plurality are connected optically in cascade.

11. A method of operating an optical transmission system which method of operation includes transmission of optical signals from a transmitter to a receiver through one or more wavelength selective fibre couplers as claimed in claim 1.

* * * * *